United States Patent [19]
Stockhowe et al.

[11] Patent Number: 6,117,311
[45] Date of Patent: Sep. 12, 2000

[54] POSITIVE SHUT OFF FUEL PUMP DISPENSING FILTER

[75] Inventors: John W. Stockhowe, Carmi; William R. Watson, Allendale; W. Scott Atteberry, West Salem, all of Ill.

[73] Assignee: Champion Laboratores, Inc., West Salem, Va.

[21] Appl. No.: 09/227,902

[22] Filed: Jan. 8, 1999

[51] Int. Cl.[7] .................................................. B01D 35/157
[52] U.S. Cl. .......................... 210/109; 137/503; 210/430; 210/440
[58] Field of Search .................................. 210/109, 430, 210/440, 443, 110, 111, 136, 416.4, 444; 137/500, 501, 503, 504

[56] References Cited

U.S. PATENT DOCUMENTS

| | | | |
|---|---|---|---|
| 4,364,825 | 12/1982 | Connor | 210/109 |
| 4,870,889 | 10/1989 | Wall | 137/503 |
| 4,959,141 | 9/1990 | Anderson | 210/440 |
| 4,986,321 | 1/1991 | Nitzberg | 137/504 |
| 5,855,780 | 1/1999 | Dye et al. | 210/430 |
| 5,989,413 | 11/1999 | Jauss et al. | 210/109 |

*Primary Examiner*—Joseph W. Drodge
*Attorney, Agent, or Firm*—Olson & Hierl, Ltd.

[57] ABSTRACT

A fuel filter for a fuel dispensing pump comprises a shell having a closed end and an open end. A plate is fixed in the open end of the shell. The plate has one or more fuel inlet openings and a centrally located fuel outlet opening. A rigid annular pervious core in located within the shell. A water absorbing media is disposed about the core. A first end cap closes the inner end of the core and the water absorbing media. A second end cap closes the outer end of the core and water absorbing media. The second end cap has a central opening there through. A valve cylinder cup is secured to the second end cap and extends within the central opening in the core. The valve cylinder cup has at least one opening in the side wall thereof. A valve piston is slidably disposed and guided in the valve cylinder cup and movable to open and close the openings in the sidewall of the valve cylinder cup. A valve spring is provided for biasing the valve piston to a position to open the opening in the side wall of the valve cylinder cup. Fuel entering the shell through the inlet openings in the plate, passes through the water absorbing media, the core, the openings in the side wall of the valve cylinder cup, through the valve piston and discharges from the fuel outlet opening, whereby the water absorbing media absorbs the water in the fuel, and as the water absorbing media absorbs more water, the pressure differential increases and the valve cylinder cup moves toward the plate and the opening in the sidewall of the valve cylinder cup is closed and the flow of fuel through the fuel filter is blocked.

5 Claims, 2 Drawing Sheets

POSITIVE SHUT OFF FUEL PUMP DISPENSING FILTER

BACKGROUND OF THE INVENTION

This invention pertains to a fuel filter for a fuel dispensing pump used, for example, in gas stations, and more particularly, to a fuel filter having a water absorbing media therein and a positive shut off valve for totally shutting down the delivery of fuel when water is present, thus preventing the delivery of contaminated fuel to the tank of a vehicle.

Should fuel, such as gasoline, be contaminated with water, it would impair the operation of an internal combustion engine used in a vehicle. Thus it is desired to provide means for preventing water from entering a vehicle gas tank during a fueling operation.

The use of a water absorbing filter in a fuel system is known to prevent the passage of water in a fuel system is known, as is the use of a ball to provide a positive water shut off. See for example, Anderson U.S. Pat. No. 4,959,141, which discloses a canister having a water absorbing media therein. The open end of the canister is closed by a plate which has inlet openings therein and a central outlet opening. The passage of fuel through the canister may be blocked by a ball valve that is retained by a first deformable washer and is releasable from the first deformable washer upon attainment of a predetermined pressure differential. The ball is movable from the first deformable washer to a position to engage a valve seat formed on a second deformable washer. The use of the ball and the washers provides an arrangement that would not function smoothly over time and would not tend to seat firmly in the event contaminants were between the ball and its seat.

Several oil filter patents are known which incorporate bypass valves, see, for example, Boewe et al. U.S. Pat. No. 2,995,249 and Humbert U.S. Pat. No. 3,184,062. However, neither of these patents suggest the fuel filter with positive shut off valve of the present invention.

An object of the present invention is to provide a fuel filter which operates smoothly and efficiently over a period of time to prevent water from entering a vehicle gas tank during a fueling operation.

Another object of the present invention is to provide a fuel filter with a positive shutoff valve comprising a valve cylinder cup and a valve piston positioned within the fuel filter shell so as to retain the compactness desired for the shell and to operate smoothly and positively over the life of the fuel filter.

Other objects and advantages of the present invention will be made more apparent hereinafter.

SUMMARY OF THE INVENTION

This invention discloses a fuel filter for a fuel dispensing pump comprising a shell having a closed end and an open end. There is a plate fixed in the open end of the shell. The plate has one or more fuel inlet openings and a centrally located fuel outlet opening. A rigid annular pervious core is provided in said shell and a water absorbing media is disposed about said core. A first end cap closes the inner end of the core and the water absorbing media. A second end cap closes the outer end of the core and water absorbing media. The second end cap has a central opening there through. There is a valve cylinder cup operatively connected to the second end cap and extending within the core. The valve cylinder cup has at least one opening in the side wall thereof. A valve piston is slidably disposed in the valve cylinder cup. The valve cylinder cup is movable relative to the valve piston to open and close the opening in the sidewall of the valve cylinder cup. A valve spring is operatively disposed between the valve piston and the valve cylinder cup for biasing the valve piston to a position to open the opening in the side wall of the valve cylinder cup. In operation, fuel entering the shell through said inlet openings in the plate passes through the water absorbing media, the core, the opening or openings in the side wall of the valve cylinder cup, through the valve piston and discharges from the fuel outlet opening. The water absorbing media absorbs the water in the fuel. As the water absorbing media absorbs more water, the pressure differential increases across the water absorbing media and the valve cylinder cup is moved with the water absorbing media, the core and the end caps toward the plate and the opening in the sidewall of the valve cylinder cup is closed by the valve piston and the flow of fuel through the fuel filter is blocked.

BRIEF DESCRIPTION OF THE DRAWING

There is shown in the attached drawing a presently preferred embodiment of the present invention, wherein like numerals in the various views refer to like elements, and wherein.

DETAILED DESCRIPTION OF THE PRESENT INVENTION

Figure 1:
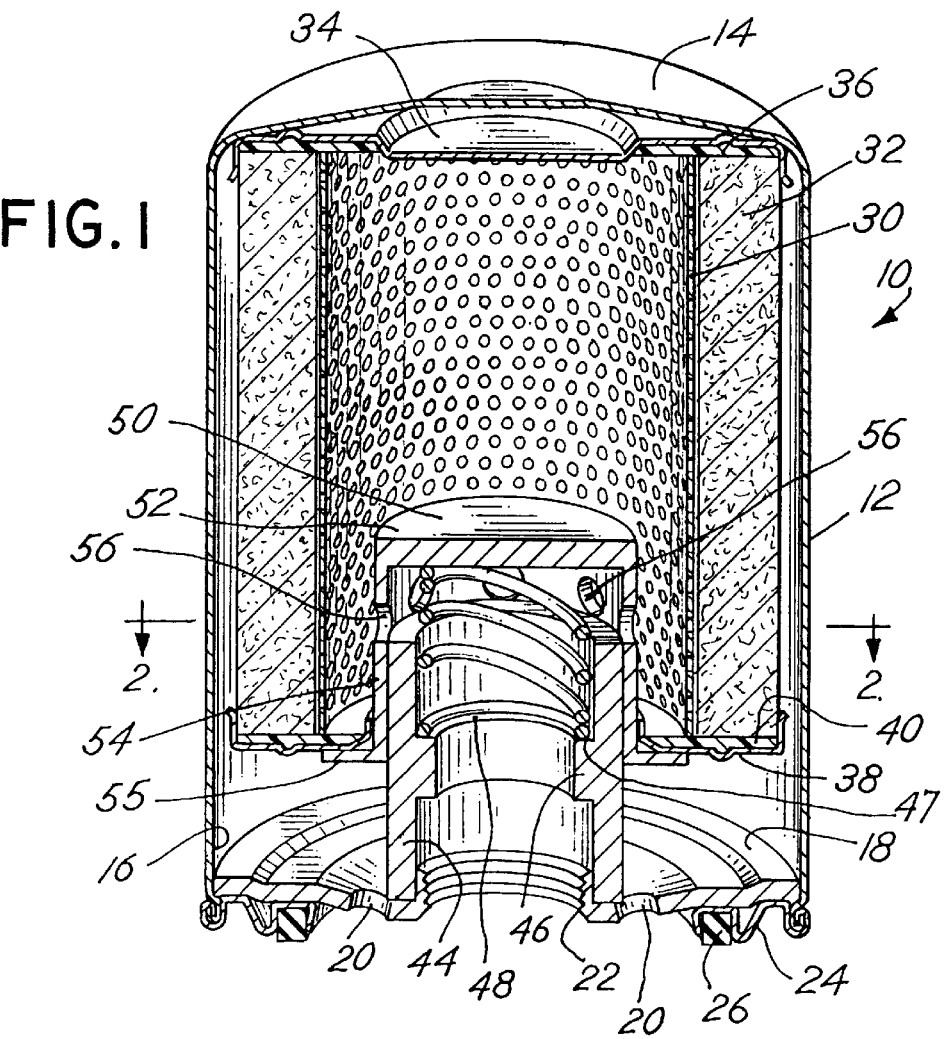
FIG. 1 is a longitudinal cross-sectional view of a fuel filter embodying a positive shut off valve comprising a valve piston movable within a valve cylinder cup.
Figure 2:
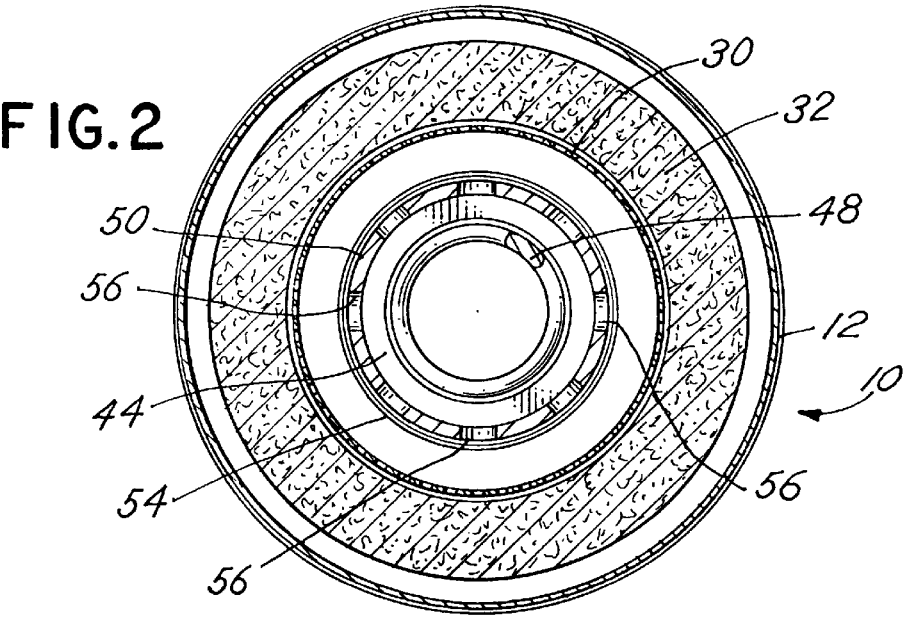
FIG. 2 is a transverse cross sectional view of the fuel filter taken generally along the line 2—2 of FIG. 1.

There is shown in FIGS. 1 and 2 a presently preferred embodiment of the fuel filter 10 of the present invention. The fuel filter 10 includes a generally cup shaped shell 12 having a closed end 14 and an open end 16. The shell 12 can be a deep drawn metallic part capable of withstanding a predetermined design pressure. The open end 16 of the shell 12 is closed by a plate 18 having a plurality of inlet openings 20 and a centrally oriented outlet opening 22. The plate 18 may be made from cold rolled steel. A gasket retainer 24 is secured to the end of the shell 12 for supporting sealing gasket 26. The gasket retainer 24 may be spot welded to the exterior surface of the plate 18 and rolled over the outer end of the shell 12. The central outlet opening 22 in the plate 18 is internally threaded for connecting the fuel filter 10 to a mounting base (not shown). When the fuel filter 10 is secured to the mounting base, the sealing gasket 26 will bear upon the mounting base and prevent leakage of fuel.

Figure 3:
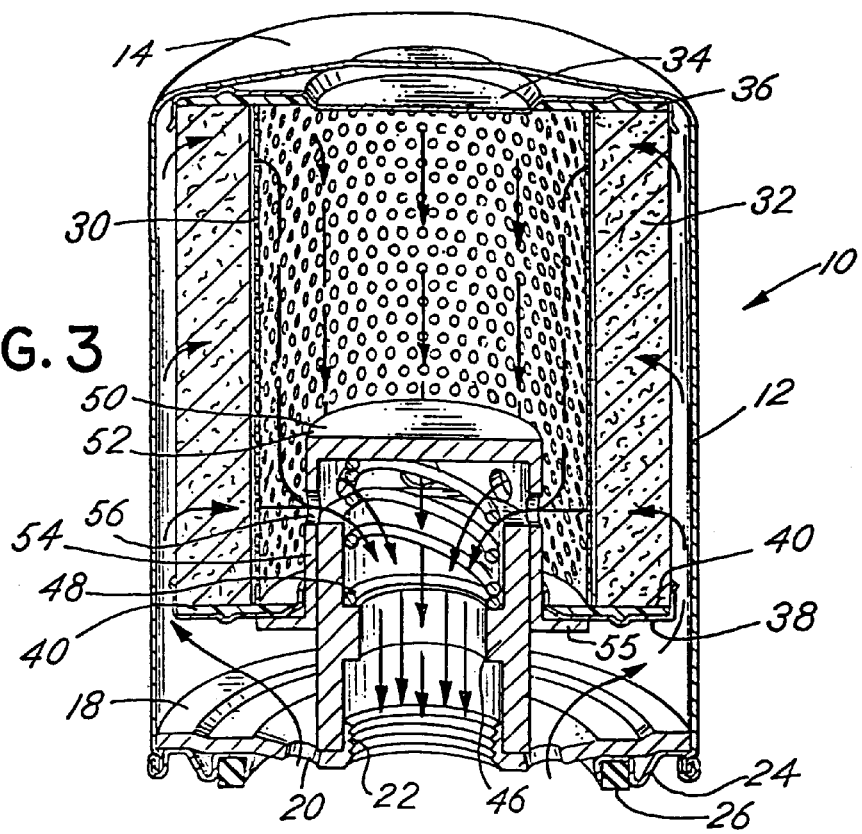
FIG. 3 is a cross sectional view of the fuel filter similar to FIG. 1, illustrating the positive shut off valve in the open position to permit the flow of fuel through the fuel filter.

Disposed within the shell 12 of the fuel filter 10 is an annular perforated core 30, which is formed from a relatively rigid material, such as coated steel. The numerous perforations in the core 30 are of a relatively small diameter. Concentrically supported on the core 30 is a water absorbing media 32, which is preferably fabricated from a suitable material, such as, for example, an absorbent laminate, laminated to phenolic resin impregnated cellulose\ polyester fiber blend filter paper. An end cap 34 is positioned between the water absorbing filter media 32 and the core 30 and the closed end 14 of shell 12 and cooperates with a resilient thermoset adhesive sealant 36 to close the inner end of the water absorbing filter media 32 to fluid flow. The end cap 34 also closes the inner end of the opening through the core 30 to fluid flow. Fluid will pass through the entire side of the water absorbing filter media 32, as seen in FIG. 3. An end cap 38 engages the outer end of the core 30 and the water absorbing media 32 and in cooperation with the resilient thermoset adhesive sealant 40 prevent the flow of fluid through the outer end of the water absorbing media 32. The end caps 34 and 38 are rigid and are preferably fabricated from metal, such as relatively thin steel or aluminum plate.

The shut-off valve means comprises a valve piston 44, which is generally cylindrical in cross section and includes an integral radially inwardly extending ring 46 that defines a shoulder 47 at the inward end of the ring 46. Slidably engaged with the valve piston 44 is a valve cylinder cup 50, which includes a closed end 52 and a generally cylindrical sidewall 54 having openings 56 there through. The valve piston 44 is guided for longitudinal movement with respect to the valve cylinder cup 50. The valve piston 44 and the cylinder valve cup 50 are preferably plastic molded parts made of a glass filled polymer, such as nylon. Positioned between the valve cylinder cup 50 and the valve piston 44 is a spiral wound compression valve spring 48 for biasing the valve cylinder cup 50 with respect to the valve piston 44 to open the openings 56 in the sidewall 54 of the valve cylinder cup 50 to fluid flow. The end cap 34 bears against the inside of the shell 12. End cap 38 bears upon the flange 55 of the valve cylinder cup 50 and thereby the end cap 38 is operatively connected to the valve cylinder cup 50. The valve spring 48 is engaged at one end with the valve cylinder cup 50 and is engaged at the other end with the valve piston 44. The valve spring 48 biases the valve piston 44 and holds same in engagement with the plate 18.

As best shown in FIG. 2, in one embodiment of the invention there are eight openings 56 in the sidewall 54 of the valve cylinder cup 50, however, as will be apparent to persons skilled in the art, the number and size of the openings 56 can be varied depending upon design considerations for a particular application.

Figure 4:
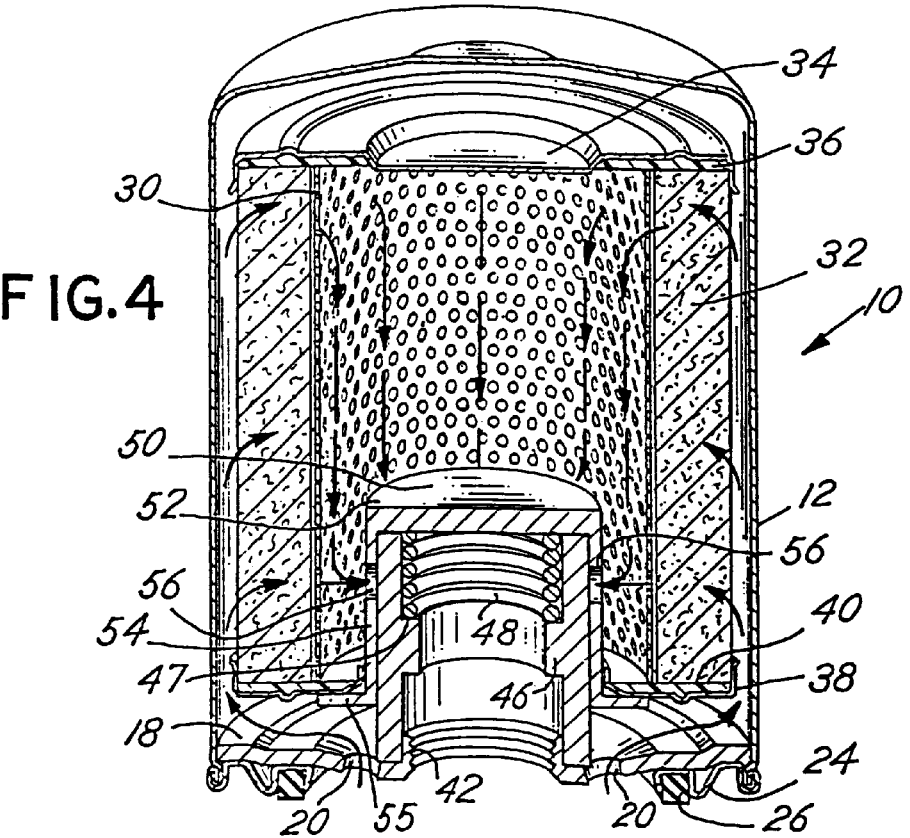
FIG. 4 is a cross sectional view of the fuel filter similar to FIG. 3, illustrating the shut off valve in the closed position blocking the flow of fuel through the fuel filter.

The operation of the fuel filter 10 of the present invention will be understood by reference to FIGS. 3 and 4. FIG. 3 shows the positive shutoff valve comprising the valve piston 44 and the valve cylinder cup 50 in the open position. The resilient spring 48 has biased the valve cylinder cup 50 from the valve piston 44 and the openings 56 in the sidewall 54 of the valve cylinder cup 50 are open to fluid flow. As indicated by the arrows, fluid will enter the shell 12 through the inlet openings 20 in the plate 18. Fluid will pass through the water absorbing media 32, the core 30, the openings 56 to the central opening in the valve piston 44 and discharge from the central opening 22 in the plate 18. Water present in the fuel will be absorbed by the water absorbing media 32.

As the water absorbing media 32 absorbs more water, the differential pressure across the water absorbing media 32 begins to increase. The pressure acts upon the top of the end cap 34 as viewed in FIGS. 3 and 4. The increased differential pressure causes the water absorbing media 32, the end cap 34 and the end cap 38 to begin moving toward the plate 18. The valve cylinder cup 50 also begins moving toward the plate 18. When the differential pressure reaches the design shut off pressure, on the order of 20–25 p.s.i., the valve piston 44 has reached the cylinder valve cup outlet holes 56 in travel and begins to block the outlet flow path of the valve cylinder cup 50. This causes a rapid increase in differential pressure, thereby completely closing the openings 56 in the side wall 54 of the valve cylinder cup 50 of the shut off valve, as shown in FIG. 4, and shutting off all fuel flow through the fuel filter 10. The operation of the shut off valve of the present invention is smooth and reliable. The fuel filter can be readily fabricated in a relatively inexpensive manner.

While we have shown a presently preferred embodiment of the present invention, it will be apparent to persons of ordinary skill in the art that the invention may be otherwise embodied within the scope of the following claims.

We claim:

1. A fuel filter for a fuel dispensing pump comprising a shell having a closed end and an open end, a plate fixed in the open end of the shell, said plate having one or more fuel inlet openings and a centrally located fuel outlet opening, a rigid annular pervious core in said shell, a water absorbing media disposed about said core, a first end cap closing the inner end of the core and water absorbing media, a second end cap closing the outer end of the core and water absorbing media, the second end cap having a central opening therethrough a valve cylinder cup having a flange extending therefrom and bearing upon the second end cap and extending within the core, said valve cylinder cup having at least one opening in the side wall thereof, a valve piston slidably disposed in the valve cylinder cup and movable to open and close the said opening in the sidewall of the valve cylinder cup, a valve spring for biasing the value cylinder cup into engagement with the second end cap and for biasing the valve piston to a position to open the opening in the side wall of the valve cylinder cup, fuel entering the shell through said inlet openings in the plate, passing through the water absorbing media, the core, the openings in the side wall of the valve cylinder cup, through the valve piston and discharging from the fuel outlet opening, whereby the water absorbing media absorbs the water in the fuel, and as the water absorbing media absorbs more water, the pressure differential increases and the valve cylinder cup moves toward the plate and the opening in the sidewall of the valve cylinder cup is closed and the flow of fuel through the fuel filter is blocked.

2. A fuel filter as in claim 1 wherein said pressure differential is effective to cause the valve cylinder cup to move relative to the valve piston to close the openings in the sidewall of the valve cylinder cup and is on the order of 20–25 p.s.i.

3. A fuel filter as in claim 1 wherein the valve piston is generally cylindrical and slides within and is guided within the valve cylinder cup.

4. A fuel filter as in claim 3 wherein the valve spring is disposed between the valve piston and the valve cylinder cup.

5. A fuel filter as in claim 4 wherein the valve piston has an inwardly extending portion that defines a shoulder, said valve spring engaging said shoulder at one end and said valve cylinder cup at the other end.

* * * * *